United States Patent [19]

Matsuura et al.

[11] Patent Number: 4,871,606
[45] Date of Patent: Oct. 3, 1989

[54] MAGNETIC RECORDING MEDIUM

[75] Inventors: Takeshi Matsuura; Akira Morioka, both of Kyoto; Yoshiyuki Takahira, Osaka, all of Japan

[73] Assignee: Hitachi Maxell, Ltd., Osaka, Japan

[21] Appl. No.: 13,286

[22] Filed: Feb. 11, 1987

Related U.S. Application Data

[63] Continuation of Ser. No. 536,434, Sep. 27, 1983, abandoned.

[30] Foreign Application Priority Data

Sep. 30, 1982 [JP] Japan ................................ 57-171293
Jul. 30, 1983 [JP] Japan ................................ 58-139960
Sep. 9, 1983 [JP] Japan ................................ 58-167321

[51] Int. Cl.$^4$ .............................................. G11B 5/72
[52] U.S. Cl. .................................... 428/147; 360/134; 360/135; 427/44; 427/122; 427/131; 428/141; 428/143; 428/323; 428/329; 428/330; 428/331; 428/425.9; 428/522; 428/523; 428/694; 428/900
[58] Field of Search ............... 428/323, 328, 329, 330, 428/331, 694, 695, 900, 141, 143, 147, 425.9, 522, 523; 360/134, 135, 136; 427/44, 122, 128, 131

[56] References Cited

U.S. PATENT DOCUMENTS

| | | | |
|---|---|---|---|
| 4,117,190 | 9/1978 | Akashi et al. | 428/325 |
| 4,135,031 | 1/1979 | Akashi et al. | 428/323 |
| 4,135,032 | 1/1979 | Akashi et al. | 428/328 |
| 4,146,031 | 3/1979 | Fujiyama et al. | 428/323 |
| 4,275,115 | 6/1981 | Naruse | 428/329 |
| 4,310,599 | 1/1982 | Akashi et al. | 428/413 |
| 4,399,189 | 8/1983 | Nakashima et al. | 428/328 |
| 4,419,406 | 12/1983 | Isobe et al. | 428/422 |
| 4,425,400 | 1/1984 | Yamaguchi et al. | 428/329 |
| 4,448,842 | 5/1984 | Yamaguchi et al. | 428/329 |
| 4,451,531 | 5/1984 | Isobe et al. | 428/329 |
| 4,474,843 | 10/1984 | Miyoshi et al. | 428/212 |
| 4,612,235 | 9/1986 | Ushimaru et al. | 428/216 |
| 4,639,389 | 1/1987 | Nishimatsu et al. | 428/141 |
| 4,668,568 | 5/1987 | Fujiyama et al. | 428/331 |

Primary Examiner—George F. Lesmes
Assistant Examiner—James B. Monroe, II
Attorney, Agent, or Firm—Birch, Stewart, Kolasch & Birch

[57] ABSTRACT

A magnetic recording medium having high running stability and good magnetic characteristics without causing an abrasion problem, which comprises a base film, a magnetic layer provided on one surface (i.e. the major surface) of the base film and a back coat layer provided on the other surface (i.e. the back surface) of the base film, the back coat layer comprising a binder and non-magnetic particles dispersed therein, characterized in that the non-magnetic particles comprise at least one soft inorganic pigment having a hardness of less than 5 in Mohs' scale of hardness and at least one hard inorganic pigment of not less than 5 in Mohs' scale of hardness and of not more than 0.2 μm in average particle size in a weight ratio of the soft pigment to the hard pigment of 99:1 to 50:50.

37 Claims, No Drawings

MAGNETIC RECORDING MEDIUM

This application is a continuation of copending application Ser. No. 536,434, filed on Sept. 27, 1983 now abandoned.

BACKGROUND OF THE INVENTION

The present invention relates to a magnetic recording medium, particularly a magnetic recording tape, comprising a base film, a magnetic layer provided on one surface (i.e. the major surface) of the base film and a back coat layer provided on the other surface (i.e. the back surface) of the base film.

A magnetic recording tape comprises a base film and a magnetic layer provided on the flat surface (i.e. the major surface) of the base film, the surface of the magnetic layer being finished to be flat. When the surfaces of the base film are too flat, the coefficient of friction between the back surface of the base film and the guide part at the passage of the magnetic recording tape is substantially increased. As a result, the running stability of the magnetic recording tape is deteriorated, and the normal recording and reproducing of signals is made difficult. In order to overcome this drawback as described above, a layer comprising non-magnetic particles is provided on the back surface of the base film to make a roughened surface. When, however, the back coat layer has an excessively roughened surface, the roughening is transferred to the surface of the magnetic layer when the tape is in a wound state and the magnetic characteristics deteriorate. Further, when the abrasion resistance of the back coat layer is too low, the nonmagnetic particles therein are readily removed and adhere onto the surface of the magnetic layer. This also deteriorates the magnetic characteristics. Furthermore, when the back coat layer is too hard, serious abrasion occurs at the parts (e.g. the tape guide) of the recording and reproducing apparatus on which the back coat layer runs in close contact.

Various proposals have been made with respect to the materials for a back coat layer, especially the kind and size of the non-magnetic particles to be included in the back coat layer. However, those proposals have failed to produce a back coat layer which is satisfactory so as to assure high running stability and good magnetic characteristics without causing any serious abrasion to that part of the apparatus on which the back coat layer runs in close contact.

As a result of extensive study, it has been found that the use of certain specific inorganic pigments as the non-magnetic particles for formation of a back coat layer can provide a magnetic recording tape having satisfactory running stability and magnetic characteristics without causing any substantial abrasion problem. The property of a substance which prevents any substantial abrasion to any other material will be hereinafter referred to as a "non-abrading property".

SUMMARY OF THE INVENTION

According to the present invention, there is provided a magnetic recording medium which comprises a base film, a magnetic layer provided on one surface (i.e. the major surface) of the base film and a back coat layer provided on the other surface (i.e. the back surface) of the base film, the back coat layer comprising a binder and non-magnetic particles dispersed therein, characterized in that the non-magnetic particles comprise at least one soft inorganic pigment of less than 5 in Mohs' scale of hardness and at least one hard inorganic pigment of not less than 5 in Mohs' scale of hardness and of not more than 0.2 $\mu$m in average particle size in a weight ratio of 99 : 1 to 50 : 50.

The magnetic recording medium of this invention has a back coat layer which comprises a soft inorganic pigment and a hard inorganic pigment in a certain weight ratio and thus has appropriate softness and hardness, and shows suitable abrasion resistance having a non-abrading property.

DETAILED DESCRIPTION

As the soft inorganic pigment, there may be used any one having a hardness of less than 5 in Mohs' scale of hardness. When the hardness is too small, the abrasion resistance and the running stability deteriorate. In general, the lower limit may be 2 in Mohs' scale of hardness. A preferred range may be from 3 to 4.5. Specific examples of the soft inorganic pigment are barium sulfate, calcium silicate, calcium carbonate, calcium sulfate, magnesium carbonate, zinc carbonate, zinc oxide, etc. Among them, the most preferred is barium sulfate, particularly of pH 7.5 to 10.

As the hard inorganic pigment, there may be employed any one having a hardness of not less than 5 in Mohs' scale of hardness. When the hardness is too large, unfavorable influences are produced on the magnetic characteristics and also on the abrasion resistance as well as the non-abrading property. Therefore, the upper limit may be 7 in Mohs' scale of hardness. A favorable range may be from 5 to 6. Specific examples of the hard inorganic pigment are alpha-$Fe_2O_3$, titanium oxide, silicon oxide, etc. Among them, the most preferred is alpha-$Fe_2O_3$.

The hard inorganic pigment is required to be not more than 0.2 $\mu$m in average particle size for preventing the depression of magnetic characteristics and exhibiting a sufficient non-abrasion property. The average particle size is based on the distribution of particle size being nearly a normal distribution of 0.35 $\mu$m in the upper limit and 0.05 $\mu$m in the lower limit. As to the soft inorganic pigment, no particular limitation is placed on the average particle size. Since, however, the excessively large particle size affords a considerable influence on the magnetic characteristics, the average particle size is preferred to be not more than 0.5 $\mu$m, especially not more than 0.2 $\mu$m.

The weight proportion of the hard inorganic pigment and the soft inorganic pigment is usually from 1:99 to 50:50, preferably from 5:95 to 30:70. When the weight proportion is not within the above range, the technical effect of the invention is not attained.

As stated above, the magnetic recording medium having a back coat layer comprising a certain mixture of inorganic pigments according to the present invention has a high running stability and good magnetic characteristics with favorable non-abrasion properties.

In general, the combined use of at least one soft inorganic pigment and at least one hard inorganic pigment affords a much better technical effect, particularly abrasion resistance, in comparison with the sole use of either of them. Quite exceptionally, barium sulfate having a pH of 7.5 to 10 produces a fairly good technical effect even when used alone, though its combined use with any hard inorganic pigment, particularly alpha-$Fe_2O_3$, affords a better result. When the pH is less than 7.5, the abrasion resistance of the back coat layer is not sufficiently improved. When the pH is more than 10, the dispersing property of the binder which is to be admixed with barium sulfate may deteriorate and/or the binder itself may be denatured. Barium sulfate is normally employed in an average particle size of not more than 2 μm. When the particle size is larger, an unfavorable influence onto the magnetic layer may be produced when the recording medium is in a wound state. Further, the dispersibility of barium sulfate into the binder is lowered so that the desired function can not be sufficiently exerted.

The barium sulfate of pH 7.5 to 10 may be prepared, for instance, by adding barium sulfate in a neutral state, as obtained by conventional procedures, to an aqueous alkaline solution, such as sodium hydroxide solution, followed by washing with water. Alternatively, barium sulfide and sodium sulfate are reacted, and the produced barium sulfate is washed with water to give barium sulfate of the desired pH.

When the magnetic recording medium is a video tape to be used for a video tape recorder of the VHS mode, at least one of the soft inorganic pigment and the hard inorganic pigment in the base coat layer of the magnetic recording medium is preferred to have a light pass preventive property.

For detection of the terminal position of a video tape in a video cassette, a light of about 9,000 Å is usually irradiated to the passage of the video tape in the cassette so as to distinguish the recording tape portion having a smaller light transmission and the leader tape portion having a larger transmission. Video tapes as recently and commercially available use the magnetic particles of a small average particle size for enhancing the magnetic characteristics in the region of high frequency waves. As a result, the masking effect of the magnetic particles is small so that the leader tape portion can be hardly distinguished from the recording tape portion.

When at least one of the soft inorganic pigment and the hard inorganic pigment has a light pass preventive property, the back coat layer comprising such a pigment has a masking effect and therefore the distinction can be easily made irrespective of whether the magnetic layer has a sufficient masking effect.

Among the hard inorganic pigments as exemplified above, alpha-$Fe_2O_3$ particles are a dark color pigment having a high light pass preventive property. Because of its high light pass preventive property, the inclusion of alpha-$Fe_2O_3$ as the hard inorganic pigment in the back coat layer produces a good masking effect even when a white pigment of high light transmittance is used as the soft inorganic pigment.

Of various combinations, a typical example recommended is the combination of alpha-$Fe_2O_3$ having a Mohs' scale of hardness of 5 to 6 and a light pass preventive property as the hard inorganic pigment and at least one of barium sulfate, calcium carbonate and zinc oxide having a Mohs' scale of hardness of 3 to 4.5 and a light transmitting property as the soft inorganic pigment. The inorganic pigments as specifically mentioned above are excellent in dispersibility into a binder so that the back coat layer prepared by their use assures good results in surface roughness, abrasion resistance, antiabrading property, etc.

The magnetic recording medium of this invention may be prepared, for instance, by applying a coating composition comprising the inorganic pigments dispersed in a binder onto the back surface of a base film such as a polyester film having a magnetic layer on the major surface, followed by drying to make a non-magnetic layer of about 1 μm in thickness.

The coating composition for formation of the back coat layer comprises the hard inorganic pigment and the soft inorganic pigment. In addition, there may be optionally included any conventional additive. For instance, the incorporation of carbon black is effective in enhancing the mechanical strength of the back coat layer and maintaining the anti-static property of the back coat layer. It shows a good light pass preventive property. The amount of carbon black may be from 3 to 50% by weight on the basis of the combined weight of the inorganic pigments with carbon black. The average particle size of carbon black may be usually from about 10 to 100 mμ (nm).

Further, for instance, a lubricant such as a higher fatty acid or its ester may be incorporated therein in order to control the coefficient of friction and increase the running stability. The amount of such lubricant may be usually from 0.5 to 5.0 parts by weight to 100 parts by weight of the non-magnetic particles such as the inorganic pigments and, when used, carbon black.

No limitation is present on the kind of the binder, and specific examples of the binder are polyurethane resins, vinyl chloride-vinyl acetate copolymers, polybutyral resins, cellulose resins, polyacetal resins, polyester resins, etc. Usually, the amount of the non-magnetic particles may be from 40 to 400 parts by weight to 100 parts by weight of the binder.

PREFERRED EMBODIMENTS

Practical and presently preferred embodiments of this invention will be hereinafter explained more in detail wherein part(s) and % are by weight.

REFERENCE EXAMPLE (Preparation of Barium Sulfate)

Barium sulfate of pH 7 having an average particle size of 0.1 μm (1,000 parts) was added to an aqueous solution of sodium sulfate (1 mol/1 liter; 10,000 parts), and the resultant mixture was stirred well. After aging for 1 hour, the dispersing particles were collected by filtration, washed well with water and dried to give particles of barium sulfate of pH 7.5 to 10 depending upon the extent of water washing.

EXAMPLE 1

Onto the major surface of a base film made of a polyester having a thickness of 14 μm and an average surface roughness at the center line of not more than 0.03 μm, a magnetic coating composition comprising the following materials was applied thereto, followed by drying to make a magnetic layer having a thickness of about 5 μm:

|  | Part(s) |
| --- | --- |
| Acicular magnetic iron oxide powder containing cobalt | 250 |
| Carbon black | 12 |
| Granular powder of alpha-$Fe_2O_3$ | 10 |
| Nitrocellulose | 22 |
| Polyurethane resin | 19 |
| Trifunctional low molecular weight isocyanate | 7 |
| n-Butyl stearate | 3 |
| Myristic acid | 6 |
| Cyclohexanone | 340 |

-continued

| | Part(s) |
|---|---|
| Toluene | 340 |

After calendering, a non-magnetic coating composition comprising the following materials was applied onto the back surface of the base film having the magnetic layer on the major surface, followed by drying to make a back coat layer having a thickness of about 1 μm:

| | Part(s) |
|---|---|
| Barium sulfate of 0.08 μm in average particle size (Moh's scale of hardness, 3.5) | 400 |
| alpha-$Fe_2O_3$ of 0.10 μm in average particle size (Moh's scale of hardness, 5 to 6) | 100 |
| Nitrocellulose | 135 |
| Polyurethane resin | 94 |
| Trifunctional low molecular weight isocyanate | 40 |
| n-Butyl stearate | 5 |
| Myristic acid | 10 |
| Cyclohexanone | 1,000 |
| Toluene | 1,000 |

The resulting film was cut in a pre-determined width to obtain a video tape.

EXAMPLES 2 TO 9 AND COMPARATIVE EXAMPLES 1 TO 3

In the same manner as in Example 1 but using the non-magnetic particles as shown in Table 1 in place of barium sulfate and alpha-$Fe_2O_3$, there were prepared 8 kinds of video tapes according to the invention and 3 kinds of video tapes for comparison.

The video tapes as prepared above were examined on the light schielding property, the surface roughness at the back coat layer, the video characteristics (color SN ratio), the abrasion resistance of the back coat layer, the running stability and the abrasion of the tape guide.

The results are as shown in Table 2.

The examinations were carried out in the following manner:

Light-pass preventive property:

Using a video tape recorder of the VHS mode, light of 9,000 Å in wave length was applied to a test tape, and the light transmission was measured.

Surface roughness:

Using a surface roughness measuring apparatus, the average roughness (Ra) on the centerline of a test tape was measured.

Color SN ratio:

Using a video tape recorder of the VHS mode, a monocolor chroma signal from a color video noise measuring apparatus was recorded on a test tape, followed by reproducing. The AM noise was measured, and the color SN ratio was calculated therefrom. Indication was made in a relative value to the standard tape.

Abrasion resistance and abrasion of a tape guide:

Using a video tape recorder of the VHS mode, the running test of a test tape recorded with 50% gray signals was repeated 100 times, and the depression of the video SN ratio after running to the video SN ratio before running was measured. Simultaneously, the abrasion states of the tape guide of the video tape recorder and of the tape guide of the video tape casette were determined by macroscopic observation.

Running stability:

Using a video tape recorder of the VHS mode, a test tape was subjected to running in 500 times. Then, the deformation of the test tape was observed. Evaluation was made on the following criteria: O: no deformation; Δ: slight deformation; X: remarkable deformation.

TABLE 1

| Non-magnetic particles | | Average particle size (μm) | Example | | | | | | | | Comparative | | |
|---|---|---|---|---|---|---|---|---|---|---|---|---|---|
| | | | 2 | 3 | 4 | 5 | 6 | 7 | 8 | 9 | 1 | 2 | 3 |
| Soft inorganic pigment | Barium sulfate (Mohs' scale of hardness, 3.5) | 0.08 | 400 | 325 | 225 | 400 | — | — | — | — | 447 | 200 | 400 |
| | | 0.20 | — | — | — | — | 400 | — | — | — | — | — | — |
| | | 0.50 | — | — | — | — | — | 400 | — | — | — | — | — |
| | Calcium carbonate (Mohs' scale of hardness, 3.0) | 0.08 | — | — | — | — | — | — | 400 | — | — | — | — |
| | Zinc oxide (Mohs' scale of hardness, 4.0 to 4.5) | 0.10 | — | — | — | — | — | — | — | 400 | — | — | — |
| Hard inorganic pigment | α-$Fe_2O_3$ (Mohs' scale hardness, 5 to 6) | 0.10 | 50 | 125 | 225 | — | 50 | 50 | 50 | 50 | 3 | 250 | — |
| | | 0.20 | — | — | — | 50 | — | — | — | — | — | — | — |
| | | 0.50 | — | — | — | — | — | — | — | — | — | — | 50 |
| Carbon black | | — | 50 | 50 | 50 | 50 | 50 | 50 | 50 | 50 | 50 | 50 | 50 |

TABLE 2

| | Example | | | | | | | | | Comparative | | |
|---|---|---|---|---|---|---|---|---|---|---|---|---|
| | 1 | 2 | 3 | 4 | 5 | 6 | 7 | 8 | 9 | 1 | 2 | 3 |
| Light transmission (%) | 0.09 | 0.05 | 0.05 | 0.04 | 0.04 | 0.05 | 0.04 | 0.05 | 0.04 | 0.07 | 0.03 | 0.03 |
| Surface roughness of back coat layer (μm) | 0.03 | 0.04 | 0.04 | 0.03 | 0.05 | 0.05 | 0.08 | 0.04 | 0.05 | 0.04 | 0.03 | 0.10 |
| Color SN ratio | +4.3 | +4.3 | +4.3 | +4.3 | +4.2 | +4.3 | +4.0 | +4.2 | +4.2 | +4.3 | +4.3 | +3.8 |

TABLE 2-continued

|  | Example | | | | | | | | | Comparative | | |
| --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 |
| (dB) | | | | | | | | | | | | |
| Abrasion resistance of back coat layer (dB) | 0.5 | 0.5 | 0.5 | 0.4 | 0.4 | 0.4 | 0.7 | 0.5 | 0.5 | 0.9 | 0.3 | 0.5 |
| Running stability | O | O | O | O | O | O | O | O | O | X | Δ | O |
| Abrasion of tape guide*[1] | A | A | A | A | A | A | A | A | A | A | B | C |

Note:
*[1] A: no abrasion; B: scarce abrasion; C: clear abrasion.

As understood from the above results, the video tapes of the invention are excellent in running stability and video characteristics. They are also excellent in nonabrading property and light shielding property.

EXAMPLE 10

Onto the major surface of a base film made of a polyester having a thickness of 14 μm and an average surface roughness at the center line of not more than 0.03 μm, a magnetic coating composition comprising the following materials was applied thereto, followed by drying to make a magnetic layer having a thickness of about 5 μm:

|  | Part(s) |
| --- | --- |
| Acicular magnetic iron oxide powder containing cobalt | 250 |
| Carbon black | 13.75 |
| Granular powder of alpha-$Fe_2O_3$ (particle size, 1.0 μm) | 13 |
| $Cr_2O_3$ powder (particle size, 1.0 μm) | 2 |
| $Al_2O_3$ powder | 5 |
| Zinc stearate | 1.25 |
| Nitrocellulose | 22.6 |
| Polyurethane resin | 20.1 |
| Trifunctional low molecular weight isocyanate | 7.5 |
| Cyclohexanone | 340 |
| Toluene | 340 |
| n-Butyl stearate | 3 |
| Myristic acid | 6.25 |

After calendering, a non-magnetic coating composition comprising the following materials was applied onto the back surface of the base film having the magnetic layer on the major surface, followed by drying to make a back coat layer having a thickness of about 1 μm:

|  | Part(s) |
| --- | --- |
| Barium sulfate of 0.08 μm in average particle size (Mohs' scale of hardness, 3.5; pH, 9.4) | 400 |
| alpha-$Fe_2O_3$ of 0.10 μm in average particle size (Moh's scale of hardness, 5 to 6) | 50 |
| Carbon black (particle size, 43 μm) | 50 |
| Nitrocellulose | 135 |
| Polyurethane resin | 94 |
| Trifunctional low molecular weight isocyanate | 40 |
| n-Butyl stearate | 5 |
| Myristic acid | 10 |
| Cyclohexanone | 1,000 |
| Toluene | 1,000 |

The resulting film was cut in a pre-determined width to obtain a video tape.

EXAMPLE 11

In the same manner as in Example 1 but using barium sulfate of pH 8.0 in the coating composition for the back coat layer, there was prepared a video tape.

COMPARATIVE EXAMPLES 4 AND 5

In the same manner as in Example 1 but using barium sulfate of pH 7 or not using alpha-$Fe_2O_3$ in the coating composition for the back coat layer, there was prepared a video tape.

Each of the video tapes as prepared in Examples 10 and 11 and Comparative Examples 4 and 5 was examined on the physical properties according to the procedures as mentioned above. The results are shown in Table 3.

|  | Example | | Comparative | |
| --- | --- | --- | --- | --- |
|  | 10 | 11 | 4 | 5 |
| Light transmission (%) | 0.05 | 0.05 | 0.05 | 0.20 |
| Surface roughness of back coat layer (μm) | 0.04 | 0.04 | 0.04 | 0.04 |
| Color SN ratio (dB) | +4.3 | +4.3 | +4.3 | +4.2 |
| Abrasion resistance of back coat layer (dB) | 0.2 | 0.2 | 0.5 | 1.2 |
| Running stability | O | O | Δ | X |
| Abrasion of tape guide*[1] | A | A | A | A |

Note:
*[1] A: no abrasion.

EXAMPLE 12

Onto the major surface of a base film made of a polyester having a thickness of 14 μm and an average surface roughness at the center line of not more than 0.03 μm, a magnetic coating composition comprising the following materials was applied thereto, followed by drying to make a magnetic layer having a thickness of about 5 μm:

|  | Part(s) |
| --- | --- |
| Acicular magnetic iron oxide | 250 |

-continued

| | Part(s) |
|---|---|
| powder containing cobalt | |
| Carbon black | 12 |
| Granular powder of alpha-Fe$_2$O$_3$ (particle size, 1.0 μm) | 10 |
| Nitrocellulose | 22 |
| Polyurethane resin | 19 |
| Trifunctional low molecular weight isocyanate | 7 |
| Cyclohexanone | 340 |
| Toluene | 340 |
| n-Butyl stearate | 3 |
| Myristic acid | 4 |

After calendering, a non-magnetic coating composition comprising the following materials was applied onto the back surface of the base film having the magnetic layer on the major surface, followed by drying to make a back coat layer having a thickness of about 1 μm:

| | Part(s) |
|---|---|
| Barium sulfate of 0.08 μm in average particle size (Mohs' scale of hardness, 3.5; pH, 8.0) | 300 |
| Nitrocellulose | 100 |
| Polyurethane resin | 70 |
| Trifunctional low molecular weight isocyanate | 30 |
| n-Butyl stearate | 3 |
| Cyclohexanone | 750 |
| Toluene | 750 |

The resulting film was cut in a pre-determined width to obtain a video tape.

EXAMPLE 13

In the same manner as in Example 12 but using a coating composition comprising the following materials for the back coat layer, there was prepared a video tape:

| | Part(s) |
|---|---|
| Barium sulfate (pH, 9.0) | 180 |
| Carbon black | 120 |
| Nitrocellulose | 100 |
| Polyurethane resin | 70 |
| Trifunctional low molecular weight isocyanate compound | 30 |
| n-Butyl stearate | 3 |
| Myristic acid | 6 |
| Cyclohexanone | 750 |
| Toluene | 750 |

COMPARATIVE EXAMPLE 6

In the same manner as in Example 12 but using barium sulfate of pH 7.0 (300 parts) in place of barium sulfate of pH 8.0 (300 parts) in the coating composition for the back coat layer, there was prepared a video tape.

Each of the video tapes as prepared in Examples 12 and 13 and Comparative Example 6 was set on a video tape recorder of the VHS mode, and reproduction was repeated 100 times. The stain at the running passage of the video tape in the video tape recorder was observed. Between Examples 12 and 13 and Comparative Example 6, remarkable difference was observed in the stain at the capstan axis; i.e. almost no stain in Examples 12 and 13, while considerable stain after the 20th running and remarkable stain after the 100th running in Comparative Example 6.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a plastic base film, a magnetic layer formed on one side of the base film and a backing layer formed on the other side of the base film, characterized in that said magnetic layer has a surface roughness of at most 0.08 μm, and said backing layer having a surface roughness of from 0.05 to 0.6 μm and is composed essentially of first particles of an inorganic pigment having an average particle size of from 0.02 to 0.5 μm and a Mohs hardness of from 2 to 4 and second particles of an inorganic pigment having an average particle size of from 0.04 to 0.5 μm and a Mohs hardness of from 5 to 7 present in a weight ratio of 1:9 to 5:5, dispersed in a thermoset or radiation-cured binder the ratio of the total of said particles to said binder being 4:1 to 1:1.

2. The magnetic recording medium according to claim 1, wherein the magnetic layer has a coercive force of at least 1,000 Oe.

3. The magnetic recording medium according to claim 2, wherein the second particles are selected from the group consisting of TiO$_2$, alpha-Fe$_2$O$_3$, Fe$_3$O$_4$, MgO, SiO$_2$, SnO$_2$ and ZrO$_2$.

4. the magnetic recording medium according to claim 2, wherein the thermoset binder is made of a thermosetting resin composition comprising nitrocellulose, a polyurethane prepolymer, a vinyl chloride-vinyl acetate copolymer, a vinyl chloride-vinyl acetate-vinyl alcohol copolymer, a vinyl chloride-vinyl alcohol copolymer and a polyisocyanate.

5. The magnetic recording medium according to claim 1, wherein the first particles are selected from the group consisting of CaCO$_3$, ZnO, MgCO$_3$ and ZnCO$_3$.

6. The magnetic recording medium according to claim 1, wherein the second particles are selected from the group consisting of TiO$_2$, alpha-Fe$_2$O$_3$, Fe$_3$O$_4$, MgO, SiO$_2$, SnO$_2$ and ZrO$_2$.

7. The magnetic recording medium according to claim 1, wherein the thermoset binder is made of a thermosetting resin composition comprising a polyurethane prepolymer, a vinyl chloride-vinyl acetate copolymer and a polyisocyanate.

8. The magnetic recording medium according to claim 1, wherein the radiation-cured binder is made of a radiation curable resin having acrylic, maleic or allyl-type double bonds.

9. The magnetic recording medium according to claim 1, wherein the magnetic layer is composed essentially of ferromagnetic alloy powder dispersed in a resin binder.

10. The magnetic recording medium according to claim 1, wherein the magnetic layer is a thin ferromagnetic metal layer.

11. A magnetic recording medium which comprises a base film, a magnetic layer provided on one surface of said base film and a back coat layer provided on the other surface of said base film, said back coat layer comprising a binder and non-magnetic particles dispersed therein, characterized in that said non-magnetic particles comprise at least one soft inorganic pigment having a hardness of from 2 to less than 5 in Moh's scale of hardness and at least one hard inorganic pigment having a hardness of from 5 to 7 in Moh's scale of hardness, said at least one hard inorganic pigment having an average particle size of not more than 0.2 microns, the weight proportion of the hard inorganic pigment to the soft inorganic pigment being from 1:99 to 50:50.

12. The magnetic recording medium according to claim 11, wherein at least one of said soft inorganic pigment and hard inorganic pigment has a light pass preventive property.

13. The magnetic recording medium according to claim 11, wherein the weight proportion of said binder to said non-magnetic particles ranges from 100 parts by weight binder to from 40 to 400 parts by weight non-magnetic particles.

14. The magnetic recording medium according to claim 11, wherein said at least one hard inorganic pigment is alpha-$Fe_2O_3$.

15. The magnetic recording medium according to claim 11, wherein said at least one soft inorganic pigment is selected from at least one member of the group consisting of barium sulfate having a pH of from 7.5 to 10, calcium carbonate and zinc oxide.

16. The magnetic recording medium of claim 15, wherein said soft inorganic pigment comprises barium sulfate having a pH of from 7.5 to 10, and having an average particle size of not more than 2 microns.

17. The magnetic recording medium according to claim 11, wherein said hard inorganic pigment comprises alpha-$Fe_2O_3$ having a Moh's scale of hardness of from 5 to 6 and a light pass preventive property and said soft inorganic pigment is selected from at least one member of the group consisting of barium sulfate, said soft inorganic pigment having a pH of from 7.5 to 10, calcium carbonate and zinc oxide having a Moh's scale of hardness of from 3 to 4.5 and a light transmitting property.

18. The magnetic recording medium according to claim 11, wherein said back coat layer further includes carbon black.

19. The magnetic recording medium according to claim 11, wherein the weight proportion of the hard inorganic pigment to the soft inorganic pigment is from 5:95 to 30:70.

20. The magnetic recording medium according to claim 19, wherein said base film comprises polyester, said back coat layer has a surface roughness of from 0.03 to 0.08, said soft inorganic pigment has an average particle size of not more than 0.2 microns, said binder comprises a dried resin, and the weight proportion of said non-magnetic particles to said binder is in the range of from 4:10 to 4:1.

21. The magnetic recording medium according to claim 19, wherein the soft inorganic pigment has a Moh's scale of hardness of from 3 to 4.5 and wherein the hard inorganic pigment has a Moh's scale of hardness of from 5 to 6.

22. The magnetic recording medium according to claim 19, wherein said soft inorganic pigment is selected from the group consisting of barium sulfate, calcium silicate, calcium carbonate, calcium sulfate, magnesium carbonate, zinc carbonate, and zinc oxide, and wherein said hard inorganic pigment is selected from the group consisting of alpha-$Fe_2O_3$, titanium oxide, and silicon oxide.

23. The magnetic recording medium according to claim 19, wherein said binder is selected from the group consisting of polyurethane resins, vinyl chloride-vinyl acetate copolymers, polybutral resins, cellulose resins, polyacetal resins, polyester resins, and mixtures thereof.

24. The magnetic recording medium according to claim 19, wherein said back coat layer further comprises an additive of carbon black in an amount of from 3 to 50% by weight of said non-magnetic particles, said carbon black having an average particle size of from about 10 to 100 nm.

25. The magnetic recording medium according to claim 19, further comprising a lubricant which is a higher fatty acid or higher fatty acid ester in an amount of from 0.5 to 5.0 parts by weight to 100 parts by weight of said non-magnetic particles.

26. The magnetic recording medium according to claim 11, wherein said back coat layer further comprises an additive for enhancing the mechanical strength and maintaining the anti-static property of said back coat layer.

27. The magnetic recording medium according to claim 26, wherein said additive comprises carbon black in an amount of from 3 to 50% by weight of said non-magnetic particles and has an average particle size of from about 10 to 100 nm.

28. The magnetic recording medium according to claim 27, further comprising a lubricant which is a higher fatty acid or higher fatty acid ester in an amount of from 0.5 to 5.0 parts by weight to 100 parts by weight of said non-magnetic particles and said additive.

29. The magnetic recording medium according to claim 17, wherein the weight proportion of the hard inorganic pigment to the soft inorganic pigment is from 5:95 to 30:70.

30. The magnetic recording medium according to claim 11, wherein said base film comprises polyester, said back coat layer has a surface roughness of from 0.03 to 0.08, said soft inorganic pigment has an average particle size of not more than 0.2 microns, said binder comprises a dried resin, and the weight porportion of said non-magnetic particles to said binder is in the range of from 4:10 to 4:1.

31. The magnetic recording medium according to claim 30, wherein the weight proportion of the hard inorganic pigment to the soft inorganic pigment is 5:5.

32. Th magnetic recording medium according to claim 11, wherein the soft inorganic pigment has a Moh's scale of hardness of from 3 to 4.5 and wherein the hard inorganic pigment has a Moh's scale of hardness of from 5 to 6.

33. The magnetic recording medium according to claim 11, wherein said soft inorganic pigment is selected from the group consisting of barium sulfate, calcium silicate, calcium carbonate, calcium sulfate, magnesium carbonate, zinc carbonate, and zinc oxide, and wherein said hard inorganic pigment is selected from the group consisting of alpha-$Fe_2O_3$, titanium oxide, and silicon oxide.

34. The magnetic recording medium according to claim 11, wherein said back coat layer includes a lubricant.

35. The magnetic recording medium according to claim 11, wherein said hard inorganic pigment comprises alpha-$Fe_2O_3$ having a Moh's scale of hardness of from 5 to 6 and wherein said soft inorganic pigment is selected from the group consisting of barium sulfate having a pH of from 7.5 to 10, calcium carbonate, and zinc oxide, said soft inorganic pigment having a Moh's scale of hardness of from 3 to 4.5.

36. The magnetic recording medium according to claim 11, wherein said binder is selected from the group consisting of polyurethane resins, vinyl chloride-vinyl acetate copolymers, polybutral resins, cellulose resins, polyacetal resins, polyester resins, and mixtures thereof.

37. The magnetic recording medium according to claim 11, further comprising a lubricant which is a higher fatty acid or higher fatty acid ester in an amount of from 0.5 to 5.0 parts by weight to 100 parts by weight of said non-magnetic particles.

* * * * *